(12) United States Patent
Smith et al.

(10) Patent No.: US 6,700,728 B2
(45) Date of Patent: Mar. 2, 2004

(54) METHOD AND DISK DRIVE FOR ENHANCED PERFORMANCE IN THE PRESENCE OF STATIONARY PES OUTLIERS

(75) Inventors: Gordon James Smith, Rochester, MN (US); Hal Hjalmar Ottesen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 09/873,490

(22) Filed: Jun. 4, 2001

(65) Prior Publication Data

US 2002/0191325 A1 Dec. 19, 2002

(51) Int. Cl.[7] .............................................. G11B 21/02
(52) U.S. Cl. ....................... 360/75; 360/77.08
(58) Field of Search ............................ 360/75, 77.04, 360/77.06, 77.02, 77.07, 77.08, 77.05, 78.09, 78.04, 60, 46, 3

(56) References Cited

U.S. PATENT DOCUMENTS

| | | | | |
|---|---|---|---|---|
| 5,241,433 A | * | 8/1993 | Anderson et al. | 360/77.04 |
| 5,510,939 A | * | 4/1996 | Lewis | 360/78.09 |
| 5,930,068 A | * | 7/1999 | Gregg et al. | 360/77.05 |
| 6,078,445 A | * | 6/2000 | Serrano et al. | 360/46 |
| 6,097,559 A | * | 8/2000 | Ottesen et al. | 360/31 |
| 6,219,198 B1 | * | 4/2001 | Dobbek et al. | 360/78.04 |
| 6,226,140 B1 | * | 5/2001 | Serrano et al. | 360/60 |
| 6,243,224 B1 | * | 6/2001 | Sacks et al. | 360/77.08 |
| 6,469,849 B1 | * | 10/2002 | Ellis et al. | 360/29 |
| 6,545,836 B1 | * | 4/2003 | Ioannou et al. | 360/77.06 |
| 6,594,103 B1 | * | 7/2003 | Despain et al. | 360/77.06 |
| 6,611,397 B1 | * | 8/2003 | Nguyen | 360/77.08 |

\* cited by examiner

Primary Examiner—David Hudspeth
Assistant Examiner—Fred F. Tzeng
(74) Attorney, Agent, or Firm—Joan Pennington (57) ABSTRACT

A method and apparatus are provided for enhanced performance in the presence of stationary position error signal (PES) outliers in a direct access storage device (DASD). A plurality of PES samples are obtained from a plurality of servo sectors around a track. Utilizing the PES samples, a normalized outlier value is computed for each of the plurality of servo sectors around the track. The computed normalized outlier values are sequentially stored and compared with a set threshold value. A stationary PES outlier is identified responsive to each stored outlier value being greater than the set threshold value. Each identified stationary PES outlier is utilized during predefined operations of the DASD. During a recalibration mode of the DASD, a different track for feedforward generation is selected to avoid an identified stationary PES outlier. When more than one stationary PES outlier is identified from the servo sectors around a track, then data from the track is reassigned to an alternate track and the flawed track is marked to avoid use for future data storage.

19 Claims, 7 Drawing Sheets

METHOD AND DISK DRIVE FOR ENHANCED PERFORMANCE IN THE PRESENCE OF STATIONARY PES OUTLIERS

FIELD OF THE INVENTION

The present invention relates generally to the data processing field, and more particularly, relates to a method and apparatus for enhanced performance in the presence of stationary position error signal (PES) outliers in a direct access storage device (DASD).

DESCRIPTION OF THE RELATED ART

Direct access storage devices (DASDs) often incorporating stacked, commonly rotated rigid magnetic disks, are used for storage of data in magnetic form on the disk surfaces. Data is recorded in concentric, radially spaced data information tracks arrayed on the surfaces of the disks. Transducer heads driven in a radial path toward and away from the drive axis write data to the disks and read data from the disk surfaces. Typically servo information is provided on one or more disk surfaces for reading by the transducer heads for accurately and reliably positioning transducer heads on the disk surfaces at a specific location to read and write data.

Typically the actuator servo information is demodulated into a position error signal (PES) and used for radial positioning of the recording head. The servo information, for example, is written in equally spaced sectors around the tracks. The sectors are lined-up almost perpendicular to the concentric circular tracks. Around the track, the servo sectors are interlaced with much larger data sectors. Occasionally the computed value of the position error signal (PES) derived from a particular servo sector has a value that lies far outside the expected value. A PES having this property is referred to a PES outlier. The PES outliers can be separated into transient and stationary outliers.

The presence of stationary PES outliers is often the cause of soft or sometimes hard data errors due to poor track misregistration (TMR). There are also many other problems caused by stationary PES outliers. First the stationary PES outliers are repeat offenders causing a performance degradation due to extra time spent on error recovery procedures (ERP). The stationary PES outliers cause problems for seek and settling actuator operations. Also the presence of a PES outlier in the PES data used for the generation of the feedforward sequence, required by the actuator servo system, will result in an undesirable phase shift in the feedforward sequence. However, no systematic method and apparatus exists to identify stationary PES outliers.

A need exists for a mechanism to facilitate enhanced performance in the presence of stationary position error signal (PES) outliers.

SUMMARY OF THE INVENTION

A principal object of the present invention is to provide a method and apparatus for enhanced DASD performance in the presence of stationary position error signal (PES) outliers. Other important objects of the present invention are to provide such method and apparatus for enhanced performance in the presence of stationary position error signal (PES) outliers substantially without negative effect and that overcome many of the disadvantages of prior art arrangements.

In brief, a method and apparatus are provided for enhanced performance in the presence of stationary position error signal (PES) outliers in a direct access storage device (DASD). A plurality of PES samples are obtained from a plurality of servo sectors around a track. Utilizing the PES samples, a normalized outlier value is computed for each of the plurality of servo sectors around the track. The computed normalized outlier values are sequentially stored and compared with a set threshold value. A stationary PES outlier is identified responsive to each stored outlier value being greater than the set threshold value. The effect of each stationary PES outlier is eliminated or reduced during predefined operations of the DASD.

In accordance with features of the invention, during a recalibration mode of the DASD, a different track for feedforward generation is selected to avoid an identified stationary PES outlier. When more than one stationary PES outlier is identified from the servo sectors around a track, then data from the track is reassigned to an alternate track and the flawed track is marked to not be used for future data storage.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
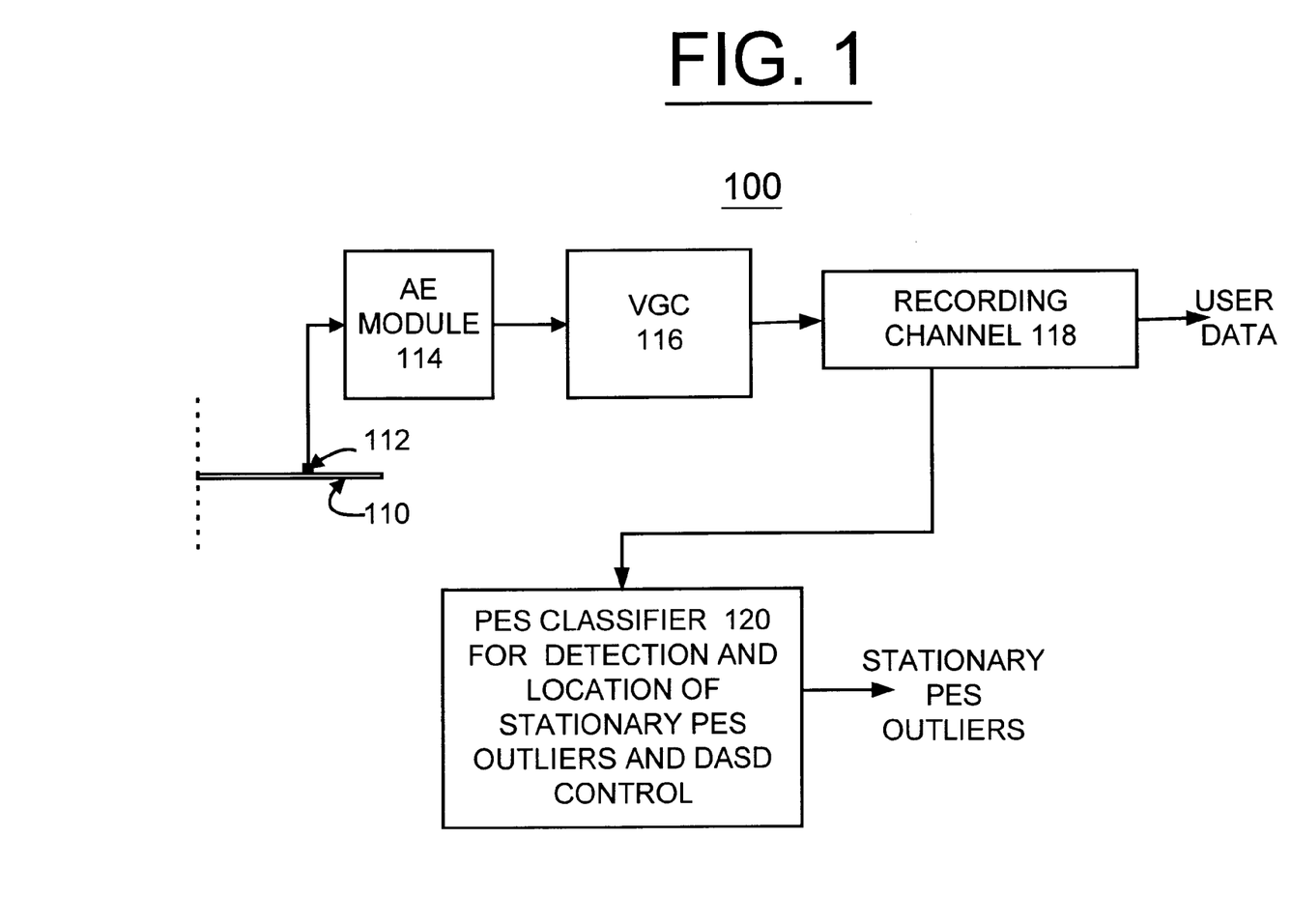
FIG. 1 is a block diagram representation illustrating a data channel for implementing methods for enhanced performance in the presence of stationary position error signal (PES) outliers in accordance with the preferred embodiment.

Having reference now to the drawings, in FIG. 1, there is shown a direct access storage device (DASD) or disk drive generally designated by 100 for implementing methods for identifying PES outliers in accordance with the preferred embodiment. As shown in FIG. 1, DASD 100 includes a recorded disk 110 that is spun at constant speed and a recording head 112 that is positioned on a given track for reading information stored on that track. The readback signal is highpass-filtered by an arm electronic (AE) module 114 and applied to a variable gain amplifier (VGA) 116. A recording channel 118 coupled to the VGA 116 provides user data at its output. The recording channel 118 is also coupled to a position error signal (PES) classifier 120 for detection and location of stationary PES outliers in accordance with the preferred embodiment.

Figure 2:
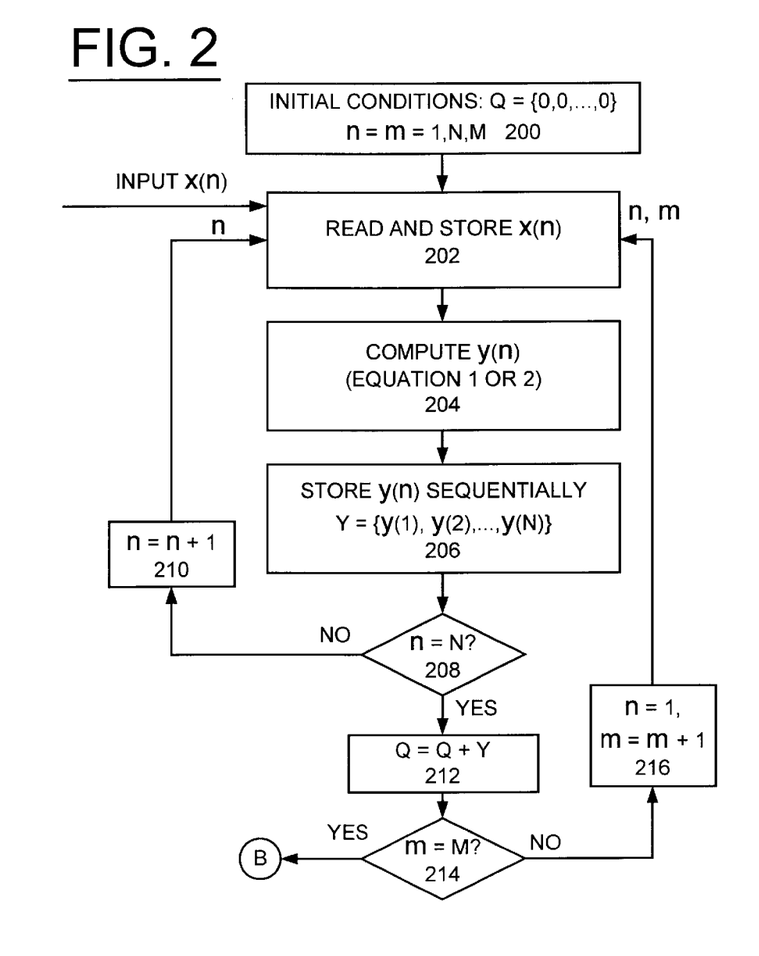
FIGS. 2 and 3 are flow charts illustrating exemplary sequential steps of methods for averaging and nonlinear differential amplification of the position error signal (PES) classifier of FIG. 1 for improved detection and location of stationary PES outliers in accordance with the preferred embodiment.
Figure 3:
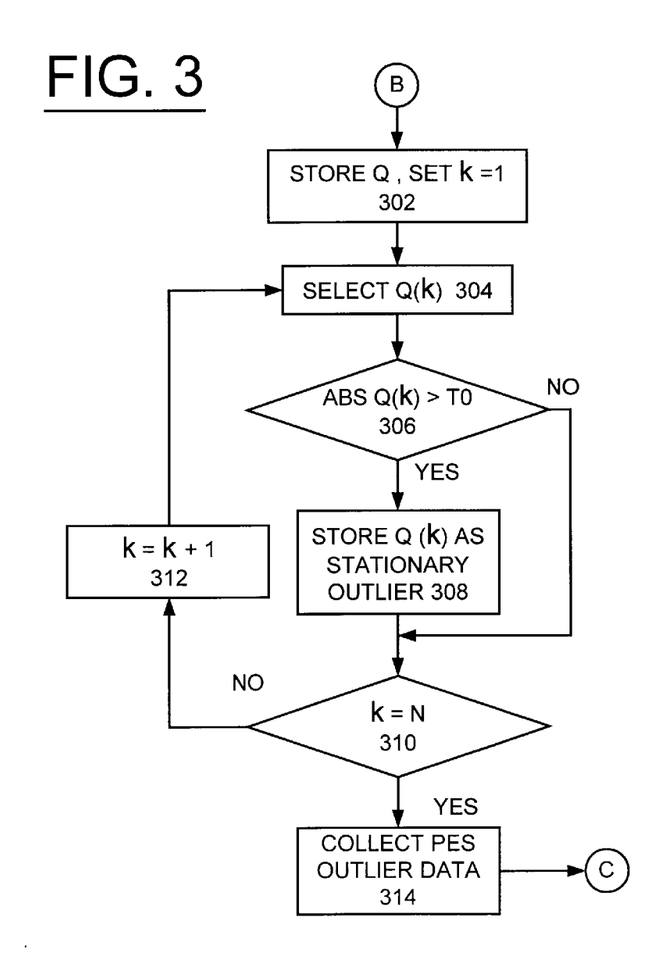

PES classifier 120 performs an averaging and nonlinear differential amplification algorithm for improved detection and location of stationary PES outliers of the preferred embodiment as illustrated and described with respect to FIGS. 2 and 3. PES classifier 120 implements enhanced performance in the presence of stationary position error signal (PES) outliers of the preferred embodiment as illustrated and described with respect to FIG. 4. PES classifier 120 of the preferred embodiment can be implemented as a microcode feature or a hardware feature of a single powerful digital processor controlling the entire disk drive 100. PES classifier 120 of the preferred embodiment is used in the generation of a feedforward sequence, recalibration (RECAL) and error recovery procedure (ERP) operations of the disk drive 100 for implementing enhanced performance in the presence of stationary position error signal (PES) outliers.

In accordance with features of the preferred embodiment, an averaging and nonlinear differential-amplification method is used for the detection and location of stationary PES outliers, that is, PES outliers synchronous with the disk revolution. Identification of a stationary PES outlier selectively is used in a reassignment of the encroaching sector. The application of the methods of the preferred embodiment will avoid most of the problems caused by stationary PES outliers. The stationary PES outlier algorithm of the preferred embodiment runs in parallel with the error recovery procedures (ERPs) and any disk drive recalibration procedure. Therefore, no extra disk drive time is required to practice the invention. The use of the methods of the preferred embodiment reduces both the number of ERPs that are due to PES outliers and the time to resolve the ERPs. This greatly enhances the performance of the disk drive, especially in a RAID environment.

A physical generation of a PES outlier can be due to many sources. When a sharp jarring force on the disk drive caused the PES outlier, then there would be concern of residual damage. From common physics, the inertia of the rotary actuator/arm/suspension structure could be computed and stored, such that an estimate the largest possible PES change that could occur within one servo-sector period due to a physical shock could be computed. Most PES outliers, however, are not caused by external shocks, but by other sources. These other sources range from periodic electrical noise glitches, position error signal demodulator noise, servo track writer (STW) glitches, localized media defects on the disk surface, and the like. One of the more common sources is a partial erasure of the servo pattern field caused by minute magnetic particle debris that are temporary attached and dragged behind in the footprint of the slider. The minute magnetic fields of these temporary attached particles are sufficient to partially erase magnetic data on the disk surface during both the seek operation and track-following operation. The dragged particle may also cause magnetic erasure due to frictional heating of the disk coating.

The PES outliers are separated into transient PES outliers and synchronous PES outliers, where the synchronous PES outliers are stationary or physically localized with respect to the disk rotation. Typically the stationary PES outliers have lower amplitude and may go undetected by the transient PES outlier detector. The stationary PES outliers introduce vibrations at the disk-spindle runout frequency into the actuator positioning servo in a track-following mode, which is detrimental to performance. In the track-following mode, the disturbance energy is much higher for a stationary PES outlier, than a transient PES outlier of much higher amplitude.

In accordance with features of the preferred embodiment, the stationary PES outlier methods of the preferred embodiment run in conjunction with or in a piggyback mode with other disk drive operations. For example, the stationary PES outlier methods of the preferred embodiment run in conjunction with the error recovery procedures (ERPs) and the disk-drive recalibration (RECAL) procedures, which are occurring at random, event-driven and/or scheduled times during the normal disk drive operation. Thus, the PES outlier identification algorithm and the enhanced performance in the presence of stationary position error signal (PES) outliers provided by PES classifier 120 of the preferred embodiment do not affect the overall drive performance.

A typical error recovery procedure (ERP) may be understood as follows. When a disk drive encounters a data error that cannot be recovered instantly by the embedded error correcting code (ECC), the disk drive switches into a special operations mode, called the ERP. First, the unreadable data is reread several times while track-following, called the retry mode. If unsuccessful, the bias current in the MR head and the recording channel frequency characteristics are changed in a prescribed sequential manner, and the retry mode is repeated. If unsuccessful, the data on adjacent tracks to the unreadable data are moved to another part of the disk, followed by erasure of those adjacent tracks. Then the position of the head is offset to both sides by incrementally applying fixed offsets that are fractions of one track pitch with respect to the track centerline and the retry mode is repeated for each offset. If the error can be recovered using any of these ERP steps, the data error is called a soft data error. Otherwise, if the data is unrecoverable, the data error is called a hard data error.

A typical Recalibration (RECAL) Operation may be understood as follows. At disk drive start-ups, at irregular disk drive servo performance events, or at prescribed times during the disk drive operation, the disk drive may go into a recalibration (RECAL) mode. The RECAL mode is a series of known operations applied to the disk drive actuator to measure its performance. Several of these operations involve physically moving the actuator, while other has the actuator making measurements in a track-following mode. One of the measurements performed in the RECAL mode is the generation of a feedforward PES signal for the actuator. A N-point feedforward sequence (FFS) is generated for each of the recording heads in the disk drive. The operation is done in the track-following mode. The position error signal (PES) is averaged in-place for several complete disk revolutions on each of several uniformly-spaced tracks across the disk surface. The overall average of the in-place PES track average for all of the uniformly-spaced tracks after some smoothing becomes the feedforward signal (FFS) for that disk surface. The FFS usually consists of the first few harmonics of the stationary position error, like a disk runout, and is used to improve the track-following accuracy of the actuator servo.

In accordance with features of the preferred embodiment, additional time is not required that will reduce the availability of the disk drive in a system like a RAID. The methods for detection and location of stationary PES outliers and for implementing enhanced performance of the preferred embodiment run in a piggyback mode with other disk drive operations including the error recovery procedures (ERPs) and disk drive recalibration (RECAL) procedures that have modes where the disk drive is in a track-following mode for many revolutions. The PES classifier 120 and PES outlier identification algorithm take advantage of these track-following modes by running in parallel with the normally scheduled operations.

The presence of a single stationary PES outlier on a given track adds a continuous and systematic disturbance at a frequency equal to the spindle frequency. For example, if the disk drive has a spindle speed of 10,000 RPM, then the PES outlier disturbance frequency would be at 166.7 Hz. This is also referred to as the runout frequency. This is detrimental to the servo operation, since the stationary PES outlier adds a continuous, vibration-like disturbance while the disk drive is in a track-following mode. The frequency of this disturbance falls within the bandwidth of the actuator's track-following servo system causing the actuator to vibrate under power at the same frequency, for example, 166.7 Hz. This vibration force, caused by the actuator, propagates throughout the disk drive housing, and to its disk drive neighbors in a RAID environment. Any vibration of this kind presents a detriment to the disk drive performance.

If a stationary PES outlier is present one of the tracks used in the feedforward signal (FFS) generation, then the disturbance would cause an undesirable phase-shift in the FFS. One example is shown in the following Table 1, where it is assumed that a first-harmonic sinusoidal FFS signal has amplitude A, which could be, for example, 10% of one track pitch. Table 1 shows a simulation of a disk drive with 90 servo sectors. The results of the amount of phase-shift and error (%) that are introduced by a single PES outlier located at sector #50 of various outlier amplitudes are shown. The problem is quite significant for large PES outliers.

TABLE 1

Effects of a Single PES Outlier on Feedforward

| PES Outlier Amplitude | Phase Shift (degrees) | Percentage Error |
|---|---|---|
| 1A | 1.68 | 2.9% |
| 2A | 2.86 | 5.0% |
| 3A | 4.10 | 7.2% |
| 4A | 5.36 | 9.4% |
| 5A | 6.64 | 11.6% |

In accordance with features of the preferred embodiment, a quality or integrity check is provided for the PES samples obtained from a track harboring a data error that requires DRP. One or more stationary PES outliers are detected and located that otherwise could potentially be the source of the data error. The physical vibrations set up by the actuator trying to follow a track having one or more stationary PES outliers otherwise could cause a localized write-to-read track misregistration (WRTMR) or write-to-write track misregistration (WWTMR) that might cause data errors. By reliably detecting smaller stationary PES outliers in the disk drive, preventive measures are invoked to circumvent the effects that these PES outliers otherwise could have on the data integrity and performance throughput of any disk drive. This will lead to an overall improvement in the disk drive reliability and availability as seen by the host system, for example, the e-server system.

The presence of stationary PES outliers on a given track can be considered to be periodic signal components in the obtained PES sensor signal, when the disk drive is in a track-following mode on that track. The averaging and nonlinear differential amplification algorithm for improved detection and location of stationary PES outliers of the preferred embodiment lies in the general field of detection of periodic components in a noisy signal. It is well known that autocorrelation methods can be used for this; however, the additional real-time computational requirements may be too large for the disk drive servo processor to handle. Two real-time, noncausal, nonlinear stationary PES outlier detection algorithms are provided. Both exhibit a very high bandwidth and very low real-time computational requirements. One requires only three add-operations and two absolute-value operations per data sample as shown in the following Equation (1). The other requires three add-operations and two multiply-operations per data sample as shown in the following Equation (2). The two algorithms for the per-sector computation of the incremental outlier value y(n) are shown below:

$$y1(n)=|x(n+1)-x(n)|+|x(n-1)-x(n)|, \text{ where } n=1,2,3,\ldots,N, \quad (1)$$

$$y2(n)=[x(n+1)-x(n)]^2+[x(n-1)-x(n)]^2, \text{ where } n=1,2,3,\ldots,N, \quad (2)$$

where x(n) are the PES samples, n is the sector index, and 1<=n<=N, where N is the total number of servo sectors around a given track. It assumes that x(0) has been measured, before y(1) is computed.

Referring now to FIGS. 2 and 3, process flow diagrams of the overall computation, averaging and detection of PES outliers in a disk drive 100 using an averaging and nonlinear differential amplification method for the detection and location of stationary PES outliers of the preferred embodiment are shown. FIGS. 2 and 3 respectively show a first and second part of the stationary PES outlier detection process performed by PES classifier 120. Referring first to FIG. 2, first initial conditions are set as indicated in a block 200, where all values of Q are set to zero, where Q is a N-element sequence vector, a sector index value n is set to one, and a revolution index value m is set to one. Also initial conditions are set for the total number of sectors per track is given in by the integer N, and the integer M represents the total number of complete revolutions (M~10 revolutions) required by the stationary PES outlier classifier 120. PES inputs x(n) are read and stored as indicated in a block 202. Next an incremental outlier value y(n) for sector n is computed using either Equation (1) or (2) as indicated in a block 204. The incremental outlier value y(n) is stored according to n in the indexed N-point vector Y as indicated in a block 206. Checking if n=N is performed as indicated in a decision block 208. If this is not the case, the sector index value n is incremented by 1 as indicated in a block 210 and sequential steps at blocks 202, 204, 206 and 208 are repeated. Finally, when n=N, then the N-point vector Y is added in-place to Q and stored back into the register containing Q as indicated in a block 212. Checking the number of complete disk revolutions m is performed as indicated in a decision block 214. If the number of revolutions m is not equal to the set number of revolutions, M, then the revolution number index m is incremented by 1 and the sector index n is set to 1 as indicated in a block 216. When PES data x(n) has been gathered, accumulated and stored in Q over M complete revolutions, the data is transferred following entry point B in FIG. 3.

Referring to FIG. 3, the accumulating storage vector is stored and a new index k, where 1<=k<=N, is set to 1 as indicated in a block 302. Based upon a current value of k, an element value Q(k) is selected from the accumulating storage vector Q as indicated in a block 304. The magnitude of the selected element value Q(k), that is |Q(k)|, is then compared with a threshold value T0 as indicated in a decision block 306. The threshold value T0=M*t0, where t0 could be a fraction of a track pitch (TP). As an example, t0=TP/4, or 25% of one track pitch. If |Q(k)|>T0, then Q(k) is identified as a PES outlier and its value is stored by index k as indicated in a block 308. If |Q(k)|≦T0, then sector k cannot be considered as a PES outlier sector. Next a check is made if all the elements in Q have been inspected for PES outlier characteristics as indicated in a decision block 310. If not, the index k is incremented by 1 as indicated in a block 312 and sequential steps the process loop consisting of blocks 304, 306, 308 and 310 are repeated for the next element in the accumulating storage vector Q. The stationary PES outlier identification process ends with accumulating the location and severity or the magnitude of any stationary PES outliers as indicated in a block 314. At block 314 the results of the PES outlier detection algorithm for a given track are collected. If there are no detected PES outliers, the RECAL process and any DRP process will go on as usual. However, if one or more PES outliers are detected on a given track, then the disk drive 100 responsive to the PES classifier 120 goes into a preventive mode that reduces the overall effects of one or more stationary PES outliers.

Figure 4:
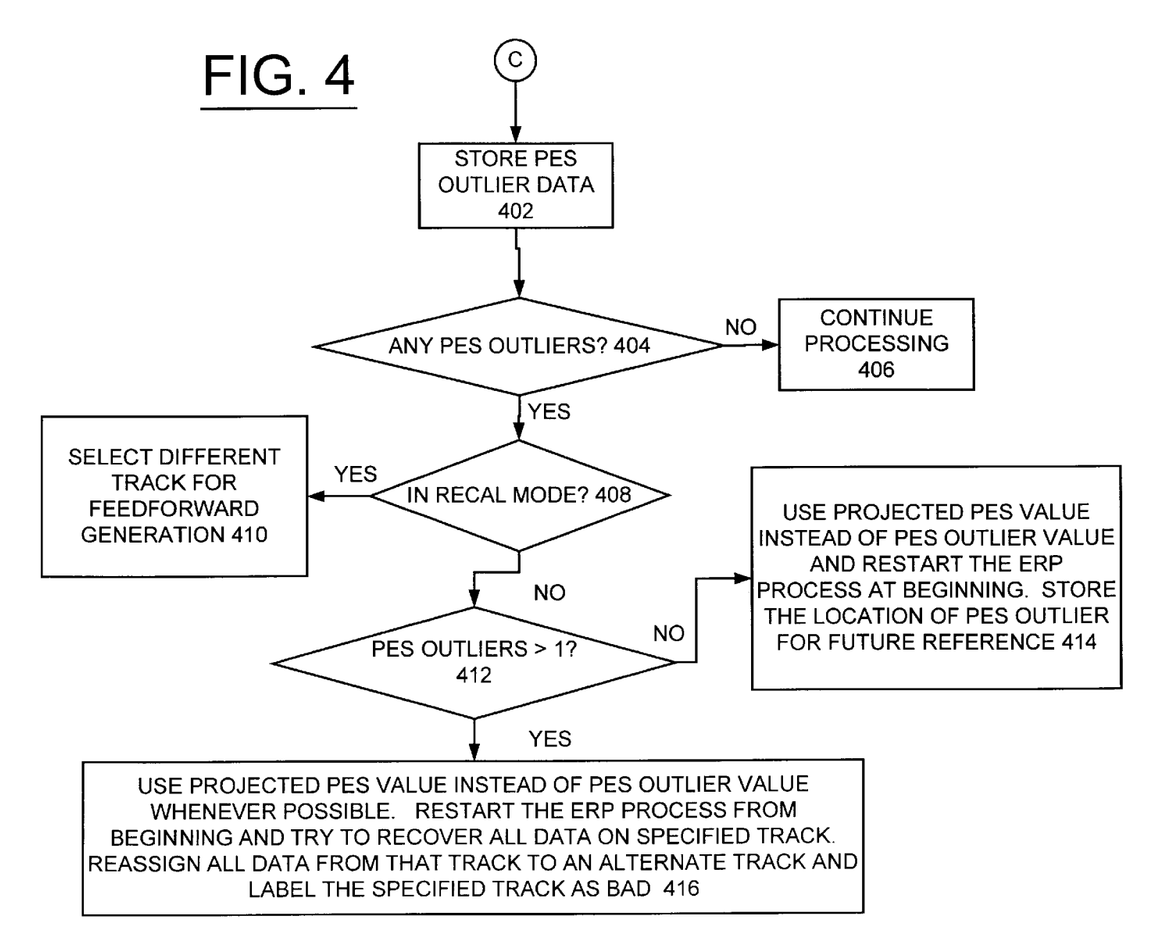
FIG. 4 is a flow chart illustrating exemplary sequential steps of methods for implementing enhanced performance in the presence of stationary position error signal (PES) outliers of the position error signal (PES) classifier of FIG. 1 in accordance with the preferred embodiment.

Referring now to FIG. 4, there is shown a flow diagram illustrating actions in the disk drive 100 responsive to these stationary PES outliers identified in FIGS. 2 and 3. Starting with the information obtained from the stationary PES outlier detection of FIGS. 2 and 3, PES outlier data to be analyzed is stored as indicated in a block 402. The stationary PES outlier is permanent, so the stationary PES outlier information including location and magnitude, is stored in the disk drive 100 for future reference. The sequential steps of FIG. 4 for handling the stationary PES outlier data are only active during one of the condition of monitoring, recalibration (RECAL) or error recovery (ERP) operations in the disk drive 100 and is running in parallel to a particular operation. Checking if there are any stationary PES outliers present is provided as indicated in a decision block 404. If not the disk drive operation continues processing in its normal mode as indicated in a block 406. If there are one or more stationary PES outliers then checking if the disk drive operation is in a RECAL mode is provided as indicated in a decision block 408. If the disk drive operation is in a RECAL mode, and if an update to the feedforward sequence (FFS) is in progress then PES classifier 120 directs the disk drive 100 to select a different track for FFS generation as indicated in a block 410. If the disk drive is not in a RECAL mode, then the number of stationary PES outliers is checked as indicated in a decision block 412. If only one stationary PES outlier is present, then PES classifier 120 directs the disk drive 100 to restart the ERP process using the projected PES value instead of the instantaneous PES value containing the stationary PES outlier as indicated in a block 414. The projected PES value is usually available in the actuator servo processor and is computed using the dynamical characteristic model of the actuator. The projected PES value at servo sector index n involves the PES values and control values from previous servo sector indices (n−1), (n−2), (n−3), and the like.

One situation where there are several stationary PES outliers on a particular track can easily occur during a partial erasure where there is a magnetic debris particle is dragged behind the slider carrying transducer head 112. In this situation PES classifier 120 directs the disk drive 100 to recover all data from that track and reassign to an alternate track as indicated in a block 416. The flawed track is marked by the disk drive 100 as bad and is not used for data storage again.

Figure 5A:
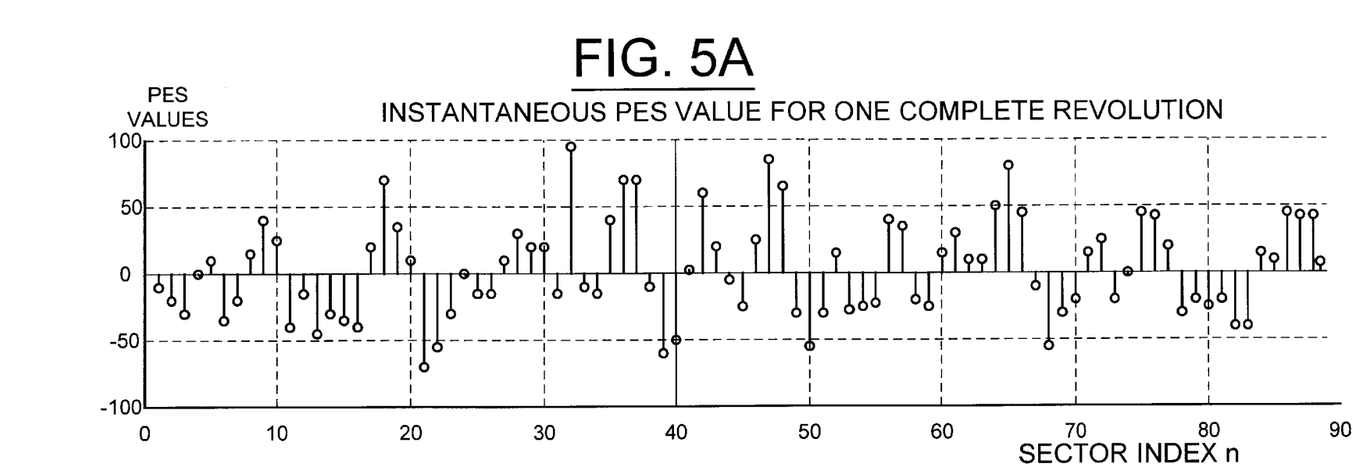
FIGS. 5A and 5B are diagrams respectively illustrating instantaneous PES values for one complete revolution, and the normalized output of the stationary PES outlier detection algorithm (squared) of FIGS. 2 and 3 in accordance with the preferred embodiment.
Figure 5B:
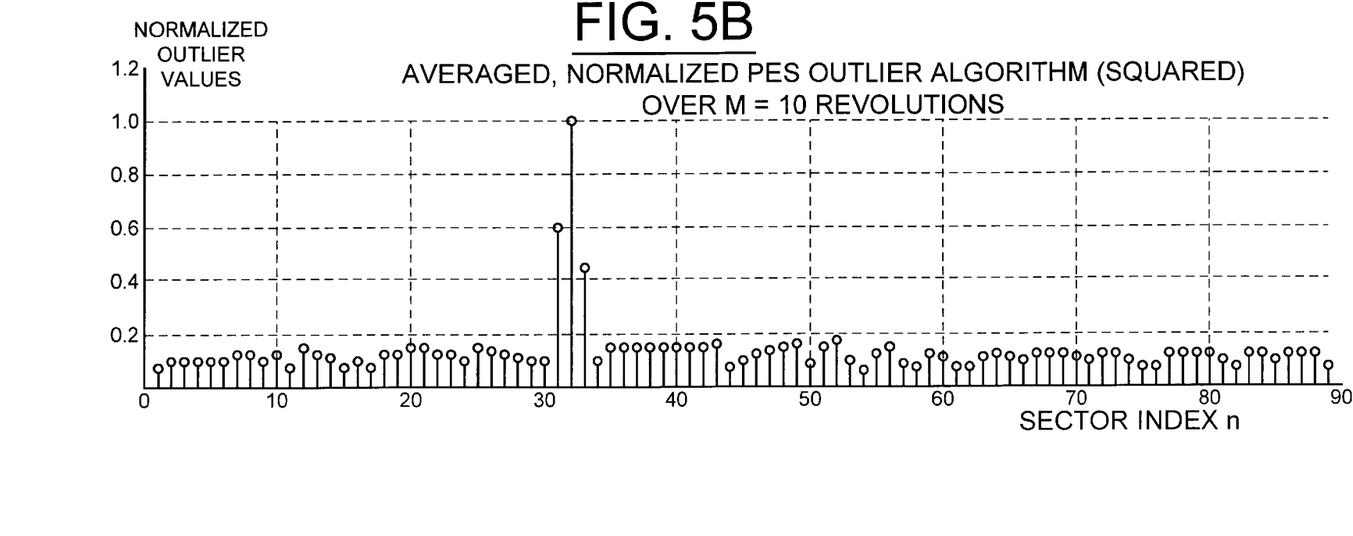
Figure 6A:
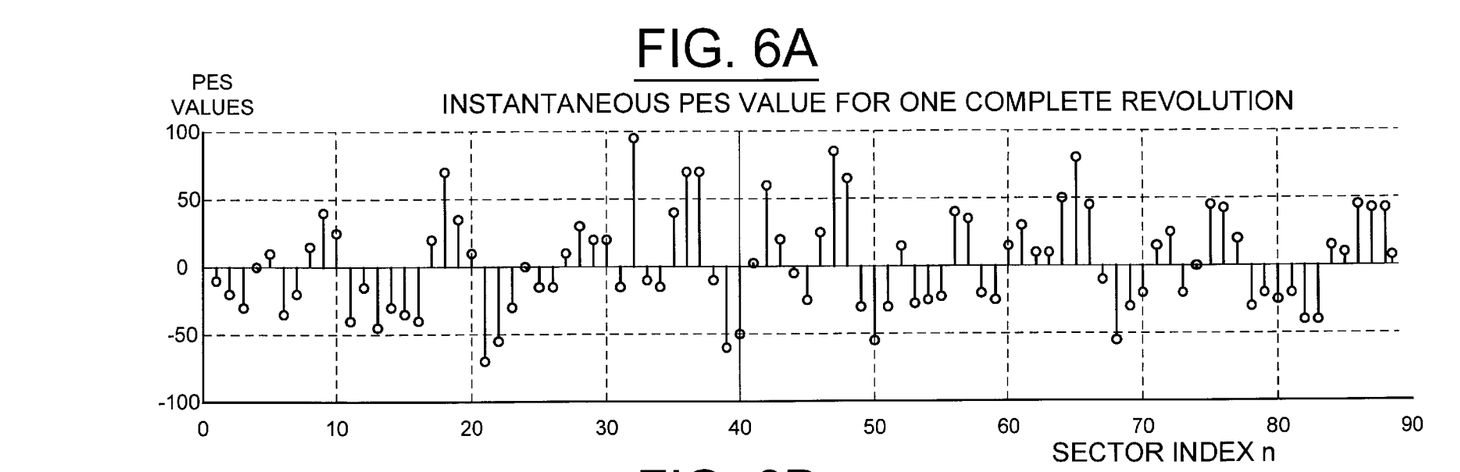
FIGS. 6A and 6B are diagrams respectively illustrating the instantaneous PES values for one complete revolution, and the normalized output of the stationary PES outlier detection algorithm (absolute value) of FIGS. 2 and 3 in accordance with the preferred embodiment.
Figure 6B:
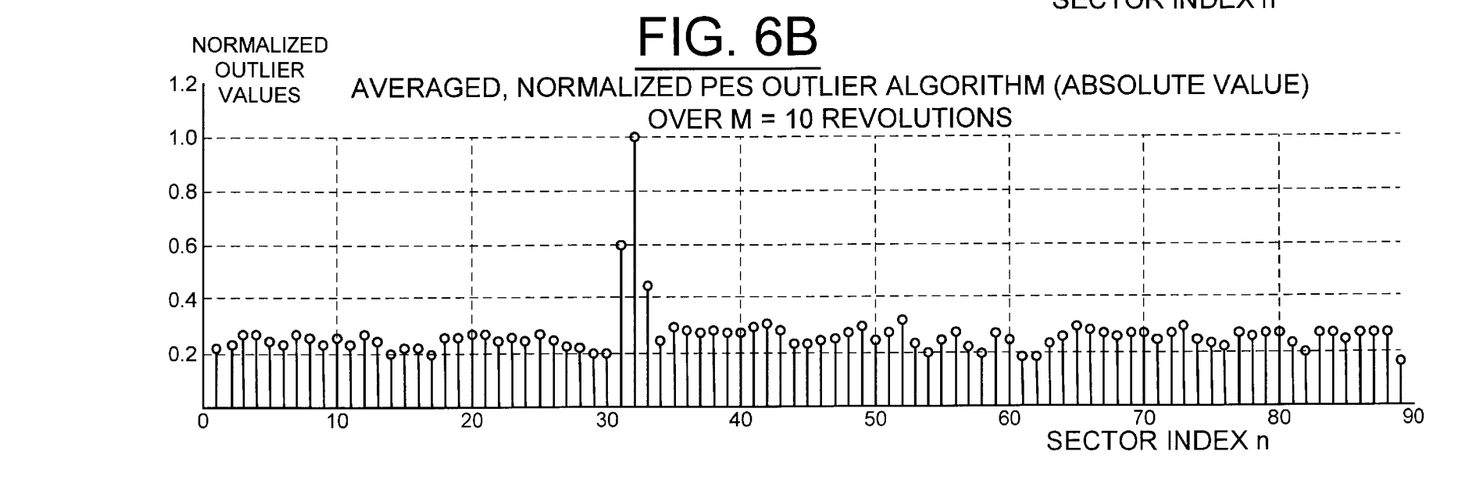

Referring now to FIGS. 5A, 5B, 6A and 6B, there are shown simulations to illustrate the operation of the PES classifier 120 of the preferred embodiment. The process flow of the stationary PES outlier detection algorithm illustrated and described with respect to FIGS. 2 and 3, was programmed in MATLAB™ and real PES data obtained from a particular disk drive was used to simulate the PES outlier identification process. The particular disk drive used has 90 servo sectors per track and the PES data represents 10 complete revolutions of the disk surface. A PES outlier of 20% of one track pitch (TP) was added to servo sector #32. Note, one TP=512 counts, the PES outlier added was 102 counts. The servo sector index n starts at zero and ends at n=89. FIGS. 5A and 6A illustrate the instantaneous PES values for one complete revolution. FIG. 5B shows the results of using the sum of the weighted square values in Equation (2) for the instantaneous PES outlier in the stationary PES outlier detection algorithm, while FIG. 6B is using Equation (1) for the same purpose.

In FIG. 5B, a clear indication of a stationary PES outlier is seen at servo sector index #32, the two adjacent neighbor spikes are byproducts of the algorithm. The largest value represents the outlier servo sector location index for a single stationary PES outlier. Note that the stationary PES outlier can hardly be distinguished in FIG. 5A.

FIG. 6B shows the effects of using the sum of the weighted absolute values in Equation (1). Notice that in FIG. 6B the average values of the differential amplification at other sectors than servo sector #32 are larger than those showed in FIG. 5B. This implies that Equation (2) illustrated in FIG. 5B has a better signal-to-noise ratio than Equation (1) in the detection of stationary PES outliers. Thus, Equation (2) is implemented in the PES classifier 120 of the preferred embodiment.

Figure 7:
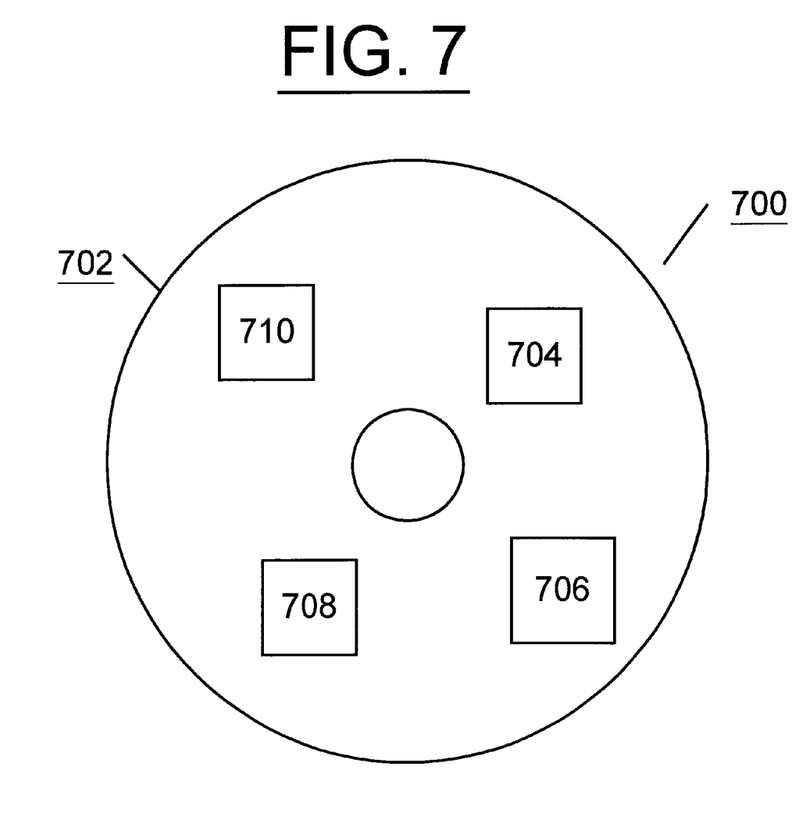
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing enhanced performance in the presence of stationary position error signal (PES) outliers of the preferred embodiment in the DASD 100 of FIG. 1.

A sequence of program instructions or a logical assembly of one or more interrelated modules defined by the recorded program means 704, 706, 708, 710, direct the DASD 100 for implementing enhanced performance in the presence of stationary position error signal (PES) outliers of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced performance in the presence of stationary position error signal (PES) outliers in a direct access storage device (DASD) comprising the steps of:

obtaining a plurality of PES samples, said plurality of PES samples obtained from a plurality of servo sectors around a track;

utilizing said PES samples, computing a normalized outlier value for said plurality of servo sectors;

sequentially storing said computed normalized outlier values;
comparing said sequentially stored normalized outlier values with a set threshold value;
identifying a stationary PES outlier responsive to each said stored outlier value being greater than said set threshold value; and
utilizing each said identified stationary PES outlier during predefined operations of the DASD.

2. A method for implementing enhanced performance in the presence of stationary position error signal (PES) outliers as recited in claim 1 wherein the step of obtaining said plurality of PES samples, said plurality of PES samples obtained from said plurality of servo sectors around said track includes the step of sequentially obtaining said plurality of PES samples during a plurality of revolutions around said track.

3. A method for implementing enhanced performance in the presence of stationary position error signal (PES) outliers as recited in claim 2 wherein the step of utilizing said PES samples, computing said normalized outlier value for said plurality of servo sectors includes the step of utilizing said PES samples, computing an averaged, normalized outlier value for said plurality of servo sectors for said plurality of revolutions around said track.

4. A method for implementing enhanced performance in the presence of stationary position error signal (PES) outliers as recited in claim 1 wherein the step of utilizing said PES samples, computing said normalized outlier value for said plurality of servo sectors includes the step of computing said normalized outlier value y(n) for said plurality of servo sectors represented by:

$$y(n)=|x(n+1)-x(n)|+|x(n-1)-x(n)|, \text{ where } n=1,2,3,\ldots,N,$$

where x(n) represents said PES samples, n represents a sector index, and 1<=n<=N, where N represents a the total number of servo sectors around said track.

5. A method for implementing enhanced performance in the presence of stationary position error signal (PES) outliers as recited in claim 4 wherein the step of computing said normalized outlier value y(n) for said plurality of servo sectors represented by:

$$y(n)=|x(n+1)-x(n)|+|x(n-1)-x(n)|, \text{ where } n=1,2,3,\ldots,N,$$

includes three add operations and two absolute value operations per said normalized outlier value y(n).

6. A method for implementing enhanced performance in the presence of stationary position error signal (PES) outliers as recited in claim 1 wherein the step of utilizing said PES samples, computing said normalized outlier value for said plurality of servo sectors includes the step of computing said normalized outlier value y(n) for said plurality of servo sectors represented by:

$$y(n)=[x(n+1)-x(n)]^2+[x(n-1)-x(n)]^2, \text{ where } n=1,2,3,\ldots,N,$$

where x(n) represents said PES samples, n represents a sector index, and 1<=n<=N, where N represents a the total number of servo sectors around said track.

7. A method for implementing enhanced performance in the presence of stationary position error signal (PES) outliers as recited in claim 6 wherein the step of computing said normalized outlier value y(n) for said plurality of servo sectors represented by:

$$y(n)=[x(n+1)-x(n)]^2+[x(n-1)-x(n)]^2, \text{ where } n=1,2,3,\ldots,N,$$

includes three add operations and two multiply operations per said normalized outlier value y(n).

8. A method for implementing enhanced performance in the presence of stationary position error signal (PES) outliers as recited in claim 1 wherein the step of sequentially storing said computed normalized outlier values includes the step of sequentially storing incremental normalized outlier values y(n) according to n in an indexed N-point vector Y, where n represents a sector index, and
1<=n<=N, where N represents a the total number of servo sectors around said track.

9. A method for implementing enhanced performance in the presence of stationary position error signal (PES) outliers as recited in claim 8 includes the step of incrementing n by one until n equals N.

10. A method for implementing enhanced performance in the presence of stationary position error signal (PES) outliers as recited in claim 1 wherein the step of comparing said sequentially stored normalized outlier values with said set threshold value includes the step of comparing said sequentially stored normalized outlier values with a predefined track pitch related value.

11. A method for implementing enhanced performance in the presence of stationary position error signal (PES) outliers as recited in claim 1 wherein the step of utilizing each said identified stationary PES outlier during predefined operations of the DASD includes the step of identifying a recalibration mode of the DASD.

12. A method for implementing enhanced performance in the presence of stationary position error signal (PES) outliers as recited in claim 11 includes the step of responsive to said identified recalibration mode of the DASD, selecting a different track for feedforward generation to avoid said identified stationary PES outlier.

13. A method for implementing enhanced performance in the presence of stationary position error signal (PES) outliers as recited in claim 1 wherein the step of utilizing each said identified stationary PES outlier during predefined operations of the DASD includes the step of restarting an error recovery process at beginning and using a projected PES value responsive to said identified stationary PES outlier.

14. A method for implementing enhanced performance in the presence of stationary position error signal (PES) outliers as recited in claim 1 wherein the step of utilizing each said identified stationary PES outlier during predefined operations of the DASD includes the step of identifying more than one stationary PES outlier and reassigning data from said track and labeling said track as bad.

15. Apparatus for implementing enhanced performance in the presence of stationary position error signal (PES) outliers in a direct access storage device (DASD) comprising:
a PES classifier for performing a nonlinear differential amplification algorithm for detecting and locating stationary PES outliers and a handling algorithm for controlling DASD operations with detected stationary PES outliers; said algorithms performed by said PES classifier including the steps of:
obtaining a plurality of PES samples, said plurality of PES samples obtained from a plurality of servo sectors around a track;
utilizing said PES samples, computing a normalized outlier value for said plurality of servo sectors;
sequentially storing said computed normalized outlier values;
comparing said sequentially stored normalized outlier values with a set threshold value;

identifying a stationary PES outlier responsive to each said stored outlier value being greater than said set threshold value; and utilizing each said identified stationary PES outlier during predefined operations of the DASD.

16. Apparatus for implementing enhanced performance in the presence of stationary position error signal (PES) outliers as recited in claim 15 wherein said PES classifier includes a processor in the DASD.

17. Apparatus for implementing enhanced performance in the presence of stationary position error signal (PES) outliers as recited in claim 16 wherein said PES classifier processor is a digital signal processor.

18. Apparatus for implementing enhanced performance in the presence of stationary position error signal (PES) outliers as recited in claim 15 wherein said handling algorithm for controlling DASD operations with detected stationary PES outliers is active during predefined operations of the DASD including recalibration or error recovery operations.

19. A computer program product for implementing enhanced performance in the presence of stationary position error signal (PES) outliers in a disk drive, said computer program product including a plurality of computer executable instructions stored on a computer readable medium, wherein said instructions, when executed by a PES classifier processor, cause the PES classifier processor to perform the steps of:

obtaining a plurality of PES samples, said plurality of PES samples obtained from a plurality of servo sectors around a track;

utilizing said PES samples, computing a normalized outlier value for said plurality of servo sectors;

sequentially storing said computed normalized outlier values;

comparing said sequentially stored normalized outlier values with a set threshold value; and identifying a stationary PES outlier responsive to each said stored outlier value being greater than said set threshold value.

* * * * *